United States Patent [19]

Nouvertné et al.

[11] Patent Number: 4,929,674

[45] Date of Patent: May 29, 1990

[54] MIXTURES OF THERMOPLASTIC POLY(ESTER) CARBONATES WITH THERMOPLASTIC POLYURETHANES

[75] Inventors: Werner Nouvertné; Franz-Josef Gielen; Peter Tacke, all of Krefeld; Ulrich Grigo, Kempen; Bernd Quiring, Leverkusen; Christian Lindner, Cologne, all of Fed. Rep. of Germany

[73] Assignee: Bayer Aktiengesellschaft, Leverkusen, Fed. Rep. of Germany

[21] Appl. No.: 332,997

[22] Filed: Apr. 4, 1989

[30] Foreign Application Priority Data

Apr. 12, 1988 [DE] Fed. Rep. of Germany ....... 3812051

[51] Int. Cl.$^5$ ............................................. C08L 75/04

[52] U.S. Cl. ......................................... 325/66; 525/67; 525/127; 525/146

[58] Field of Search .................... 525/66, 67, 146, 127

[56] References Cited

U.S. PATENT DOCUMENTS

| 4,569,970 | 2/1986 | Paul et al. | 525/67 |
| 4,743,650 | 5/1988 | Boutni | 525/92 |

*Primary Examiner*—Theodore E. Pertilla
*Attorney, Agent, or Firm*—Connolly and Hutz

[57] ABSTRACT

This invention relates to mixtures of thermoplastic aromatic poly(ester)carbonates with thermoplastic polyurethanes containing special graft polymers and, optionally, suitable additives, to a process for their production and to the use of the mixtures according to the invention for the production of moldings, particularly by injection molding or extrusion.

6 Claims, No Drawings

MIXTURES OF THERMOPLASTIC POLY(ESTER) CARBONATES WITH THERMOPLASTIC POLYURETHANES

This invention relates to mixtures containing
 (A) 45 to 87% by weight and preferably 55 to 82% by weight thermoplastic, aromatic poly(ester) carbonates,
 (B) 30 to 12% by weight and preferably 25 to 12% by weight thermoplastic polyurethanes and
 (C) 25 to 1% by weight and preferably 20 to 6% by weight graft polymers obtainable by the known grafting of
 (C1) 5 to 30 and preferably 10 to 30 parts by weight alkyl (meth)acrylates onto
 (C2) 95 to 70 and preferably 90 to 70 parts by weight crosslinked diene rubbers, the sum of (C1)+(C2) being 100 parts by weight and the average particle diameter $d_{50}$ of the crosslinked diene rubbers (C2) being from 0.2 to 0.6 μm, preferably from 0.3 μm to 0.5 μm and more preferably 0.4 μm.

(For determination of the average particle diameter $d_{50}$, see for example W. Scholtan and H. Lange, Kolloid-Z und Z. Polymere 250 (1972) 782–796 and G. Kämpf, H. Schuster, Angew. Makromolekulare Chemie 14 (1070), pages 111–129).

In the context of the invention, aromatic poly(ester) carbonates are both aromatic polycarbonates with no incorporated aromatic dicarboxylic acid groups and aromatic polyester carbonates in which at most 50 mol-% of the carbonate groups are replaced by aromatic dicarboxylic acid groups.

Mixtures of polycarbonate and 0.25 to 50% of a polyurethane and 0.01 to 2.0% of a graft polymer (alkenyl cyanide and aromatic vinyl compounds on polybutadiene) are known from DE-OS 2 304 214 and U.S. Pat. No. 3,813,358. The mixtures show improved surface properties.

U.S. Pat. No. 4,169,479 describes thermoplastic polyurethane elastomer mixtures of 40 to 100% of a thermoplastic polyurethane, 0 to 60% of a thermoplastic polymer (polycarbonate) and 0.5 to 10% of an acrylic polymer. The products are distinguished by good homogeneity of the mixture while the moldings are distinguished by improved gloss. No graft polymers are subsumed as the acrylic polymers.

U.S. Pat. No. 4,350,799 and EP-A 0 074 594 describe mixtures of thermoplastic polyurethanes, thermoplastic polyphosphonates and thermoplastic polycarbonates which show improved flame resistance.

Mixtures of one or more graft polymers, one or more copolymers, one or more polycarbonates and one or more polyurethanes are known from EP-OS 0 104 695. Mixtures such as these are said to show high resistance to gasoline, favorable processing properties and good flow behavior.

The polyurethanes used are elastic polyurethanes (page 7, paragraph 4 of EP 0 104 695). Polybutadiene, butadienestyrene, butadiene-acrylonitrile or butadieneacrylate rubbers are mentioned in particular as the rubber base for the production of the graft polymers (page 3, lines 22/24 of EP 0 104 695).

The graft monomers are mixtures of 20 to 40% by weight acrylic compounds with 80 to 60% by weight aromatic vinyl compounds and, optionally, 0 to 20% by weight other unsaturated compounds.

Suitable acrylic compounds are inter alia alkyl acrylates and alkyl methacrylates or mixtures thereof (page 2, last paragraph of EP 0 104 695).

EP-A 0 125 739 describes mixtures of 50 to 95 parts by weight polycarbonates or polyesters, 2.5 to 15 parts by weight thermoplastic polyurethanes and 2.5 to 35 parts by weight ethylene/propylene/diene rubbers which have not been treated with ethylenically unsaturated compounds containing or capable of forming carboxyl groups. (Meth)acrylates are not mentioned in this connection. However, the molding compounds according to EP 0 125 739 are still attended by serious disadvantages (see Table 2, tests 11 and 12).

DE-OS 3 521 407 (Le A 23 628) describes thermoplastic molding compounds showing improved flow line strength.

The molding compounds contain thermoplastic polycarbonates, two different graft polymers and a copolymer and, optionally, additives such as stabilizers, pigments, flow aids, mold release agents, flameproofing agents and/or antistatic agents. Methyl methacrylate is mentioned as a graft monomer while polybutadiene, for example, is suitable as the rubber to be grafted.

A thermoplastic polyurethane is used as the flow aid in quantities of 2 parts by weight to 100 parts by weight of the molding compound of polycarbonate, graft polymer copolymer.

DE-OS 3 521 408 (Le A 23 887) describes molding compounds of polycarbonates (A), graft polymers (B) and, optionally, copolymers (C) which contain from 0.5 to 10 parts by weight, based on 100 parts by weight of the molding compound of (A)+(B) and, optionally, (C), of a special polyurethane. The resulting products show improved flow combined with good thermal stability.

All in all, it may be stated that the compatibility of polycarbonate-polyurethane mixtures still does not satisfy current practical requirements. Moldings produced therefrom by injection molding show serious flaking, surface defects, flow line shadows and, unless the optimal processing conditions are strictly maintained, also poor flow line strengths. The difficulties become even more serious in cases where the known molding compounds are pigmented.

It has now surprisingly been found that mixtures of polycarbonates, thermoplastic polyurethanes and graft polymers of (meth)acrylates on crosslinked diene rubbers having a certain particle size do not possess the disadvantages mentioned above. Excellent compatibility and molding surfaces are achieved. This also applies where polyester carbonates are used instead of polycarbonates. Moldings produced therefrom show in particular improved resistance to fuels, so that they may be used with advantage in vehicle construction.

COMPONENT A

Thermoplastic, aromatic poly(ester) carbonates according to the present invention are reaction products of diphenols with carbonic acid derivatives, such as phosgene and diaryl carbonates, and optionally aromatic dicarboxylic acid derivatives.

The aromatic poly(ester) carbonates may be homopolycarbonates or copolycarbonates and may be linear or branched. As already mentioned, up to at most 50 mol-% of the carbonate groups may be replaced by aromatic ester groups, both statistical distribution and also a block-like distribution being possible.

The poly(ester) carbonates suitable as component (A) are known from the literature or may be produced by methods known from the literature (cf. for example U.S. Pat. Nos. 3,028,365, 3,275,601; H. Schnell, "Chemistry and Physics of Polycarbonates", Interscience Publishers, New York, G.S. Kolesnikow et al., J. Polym. Sci., USSR, Vol. 9, 1967, pages 1705-1711, U.S. Pat. Nos. 3,169,121, 3,409,704, DE-OS 2 714 544, DE-OS 2 758 030 and EP-OS 36 080 (Le A 20 203)).

Suitable diphenols for the production of the poly(ester) carbonates of component (A) are those corresponding to formula

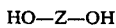
HO—Z—OH    (1)

in which Z is a double-bonded, aromatic, mononuclear or polynuclear, optionally fused radical preferably containing from 6 to 30 C atoms.

Preferred diphenols are compounds corresponding to formula (II)

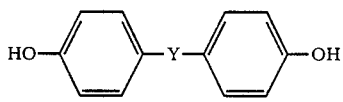

in which Y is a single bond, an alkylene or alkylidene radical containing 1 to 7 C atoms, a cycloalkylene or cycloalkylidene radical containing 5 to 12 C atoms,

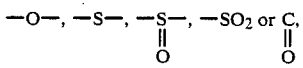

and nucleus-halogenated derivatives thereof.

Examples of diphenols are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl)-diisopropylbenzenes and also nucleus-halogenated compounds thereof.

Examples of preferred diphenols are 4,4'-dihydroxydiphenyl, 2,4bis-(4-hydroxyphenyl)-2-methyl butane, α,α'-bis-(4-hydroxyphenyl)-p-diisopropyl benzene, 2,2-bis-(3-chloro-4-hydroxyphenyl)-propane, 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

These diphenols are known from the literature or may be produced by known methods. They may be used both individually and also in admixture for the production of the polycarbonates or the polyester carbonates.

The aromatic polycarbonates or polyester carbonates of component (A) may be branched in known manner by the incorporation of small quantities of more than difunctional compounds (see for example DE-OS 1 570 533, US-CIP-RE- 27 682 and DE-OS 3 007 934).

From 0.05 to 2.0 mol-%, based on mols diphenols used, of branching agent are used for branching the aromatic polycarbonates.

0.01 to 1 mol-%, based on mols dicarboxylic acid dichlorides used or on mols diphenols used (depending on whether polycarboxylic acid chlorides or polyphenols are used as branching agents) are used for branching the aromatic polyester carbonates.

Some of the preferred compounds containing more than two phenolic hydroxy groups are, for example, phloroglucin, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-([4,4-bis-(4-hydroxyphenyl)-cyclohexyl]-propane, 2,6-bis-(2'-hydroxy-5'methyl benzyl)-4-methyl phenol, 2-(4-hydroxyphenyl)-2-(2,4-dihydroxyphenyl)-propane, hexa-(4-hydroxyphenyl isopropyl)-phenyl)-orthoterephthalic acid ester, tetra-(4-hydroxyphenyl)-methane, tetra-(4-(4-hydroxyphenyl isopropyl)-phenoxy)-methane and 1,4-bis-((4',4''-dihydroxytriphenyl)-methyl)-benzene.

Other trifunctional compounds for the branching of polycarbonates are, for example, 2,4-dihydroxybenzoic acid, trimesic acid, cyanuric chloride and 3,3-bis-(4-hydroxy-3-methyl phenyl)-2-oxo-2,3-dihydroindole.

The polyester carbonates may be branched, on the one hand, with the above-mentioned polyphenols containing more than two phenolic OH groups and also with the following trifunctional or more than trifunctional carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride.

The branching agents mentioned above are known from the literature or may be produced by methods known from the literature.

The aromatic polycarbonates and polyester carbonates of component (A) have relative solution viscosities of generally 1.16 to 1.5 and preferably 1.2 to 1.35, as measured in CH$_2$Cl$_2$ at 25° C. and at a concentration of 0.5 g polycarbonate in 100 ml solution.

This corresponds to an $\overline{Mw}$ (weight average molecular weight determined by ultracentrifugation or scattered light measurement) in the range from 13,000 to 52,000 and preferably in the range from 17,000 to 35,000.

Preferred chain terminators for adjusting the molecular weights of the poly(ester) carbonates of component (A) are phenol, alkylphenols containing C$_1$–C$_{12}$ alkyl groups, halogenated phenols, hydroxydiphenyl, naphthols, chlorocarbonic acid esters of these phenolic compounds and chlorides of aromatic monocarboxylic acids which may optionally be substituted by C$_1$–C$_{22}$ alkyl groups and halogen atoms, also chlorides of aliphatic monocarboxylic acids containing up to 25 C atoms in quantities of from 0.1 to 10 mol-% (in the case of phenols, based on diphenols; in the case of acid chlorides, based on acid dichlorides).

Preferred aromatic polycarbonates of component (A) are those based on one or more of the preferred diphenols mentioned. Particularly preferred polycarbonates are copolycarbonates based on 2,2-bis-(4-hydroxyphenyl)-propane (bisphenol A) and one or other of the particularly preferred diphenols mentioned. Bisphenol-A-homopolycarbonate is more particularly preferred.

Preferred aromatic polyester carbonates of component (A) are those based on one or more of the preferred diphenols mentioned and isophthalic and/or terephthalic acid and one or more carbonic acid derivatives.

Thermoplastic polyurethanes of component (B) according to the present invention are reaction products of diisocyanates, completely or predominantly aliphatic oligoesters and/or polyesters and/or ethers and one or more chain-extending agents. These thermoastic polyurethanes are substantially linear and show thermoplastic processing characteristics.

The thermoplastic polyurethanes are either known or may be prepared by known methods (cf. for example U.S. Pat. No. 3,214,411; J. H. Saunders and K. C. Frisch, "Polyurethanes, Chemistry and Technology", Vol. II. pages 299 to 451, Interscience Publishers, New York, 1964 and Mobay Chemical Corporation, "A Processing Handbook for Texin Urethane Elastoplastic Materials", Pittsburgh, Pa.).

Starting materials for the production of the oligoesters and polyesters are, for example, adipic acid, succinic acid, suberic acid, sebacic acid, oxalic acid, methyl adipic acid, glutaric acid, pimelic acid, azelaic acid, phthalic acid, terephthalic acid and isophthalic acid. Adipic acid is preferred.

Suitable glycols for the production of the oligoesters and polyesters are, for example, 1,2- and 1,3-propylene glycol, butane-1,2-, -1,3-, -1,4-, -2,3- and -2,4-diol, hexanediol, bishydroxymethyl cyclohexane, diethylene glycol and 2,2-dimethyl propylene glycol. In addition, small quantities of up to 1 mol-% of trifunctional or higher alcohols, for example trimethylolpropane, glycerol, hexanetriol, etc., may be used together with the glycols.

The resulting hydroxyl oligoesters or polyesters have a molecular weight of at least 600, a hydroxyl value of from about 25 to 190 and preferably from about 40 to 150, an acid value of from about 0.5 to 2 and a water content of from about 0.01 to 0.2%.

Oligoesters or polyesters are also oligomeric or polymeric lactones such as, for example, oligocaprolactone or polycaprolactone, and aliphatic polycarbonates, such as for example polybutane-1,4-diol carbonate or polyhexane-1,6-diol carbonate.

A particularly suitable oligoester which may be used as starting material for the thermoplastic polyurethanes is prepared from adipic acid and a glycol containing at least one primary hydroxyl group. The condensation is terminated on reaching an acid value of 10 and preferably from about 0.5 to 2. The water formed during the reaction is separated off simultaneously or afterwards, so that the final water content is of the order of 0.01 to 0.05% and preferably of the order of 0.01 to 0.2%.

Oligoethers or polyethers for the production of the thermoplastic polyurethanes according to component (B) are, for example, those based on tetramethylene glycol, propylene glycol and ethylene glycol.

Polyacetals are also to be understood as polyethers and may be used as such.

The oligoethers or polyethers should have average molecular weights $\overline{M_n}$ (number average determined via the OH value of the products) in the range from 600 to 2000 and preferably in the range from 1000 to 2000.

4,4'-diphenyl methane diisocyanate is preferably used as the organic diisocyanate for the production of the polyurethanes of component (B). It should contain less than 5% 2,4'-diphenyl methane diisocyanate and less than 2% of the dimer of diphenyl methane diisocyanate. It is also desirable that the acidity, expressed as HCl, should be of the order of 0.005 to 0.2%. The acidity expressed as % HCl is determined by extraction of the chloride from the isocyanate in hot aqueous methanol solution or by liberation of the chloride during hydrolysis with water and titration of the extract with standard silver nitrate solution in order to obtain the chloride ion concentration present therein.

Other diisocyanates may also be used for the production of the thermoplastic polyurethanes of component (B), for example the diisocyanates of ethylene ethylidene, propylene, butylene, 1,3-cyclopentylene, 1,4-cyclohexylene, 1,2-cyclohexylene, 2,4-tolylene, 2,6-tolylene, p-phenylene, n-phenylene, xylene, 1,4-naphthylene, 1,5-naphthylene, 4,4'-diphenylene, the 2,2'-diphenyl propane-4,4'-diisocyanate, the azobenzene-4,4'-diisocyanate, the diphenyl sulfone-4,4'-diisocyanate, the dichlorohexane methylene diisocyanate, the pentamethylene diisocyanate, the hexamethylene diisocyanate, the 1-chloro-benzene-2,4-diisocyanate, the furfuryl diisocyanate, the dicyclohexyl methane diisocyanate, the isophorone diisocyanate, the diphenyl ethane diisocyanate and bis-(isocyanatophenyl)-ether of ethylene glycol, butanediol, etc.

Suitable chain extenders are organic difunctional compounds containing active isocyanate-reactive hydrogen, for example diols, hydroxycarboxylic acids, dicarboxylic acids, diamines and alkanolamines and water. Examples of such chain extenders are ethylene glycol, propylene glycol, butylene glycol, butane-1,4-diol, butanediol, butynediol, xylylene glycol, amylene glycol, 1,4-phenylene-bis-β-hydroxyethyl ether, 1,3-phenylene-bis-β-hydroxyethyl ether, bis-(hydroxymethyl cyclohexane), hexanediol, adipic acid, ω-hydroxycaproic acid, thiodiglycol, ethylenediamine, propylenediamine, butylene diamine, hexamethylenediamine, cyclohexylenediamine, phenylene diamine, toluylenediamine, xylylenediamine, diaminodicyclohexyl methane, isophorone diamine, 3,3'-dichlorobenzidine, 3,3'-dinitrobenzidine, ethanolamine, aminopropyl alcohol, 2,2-dimethylpropanolamine, 3-aminocyclohexyl alcohol and p-aminobenzyl alcohol. The molar ratio of oligo or polyester to bifunctional chain extender is in the range from 1:1 to 1:50 and preferably in the range from 1:2 to 1:30.

In addition to difunctional chain extenders, small quantities of up to about 5 mol-%, based on mols of the bifunctional chain extender used, of trifunctional or more than trifunctional chain extenders may also be used.

Trifunctional or more than trifunctional chain extenders of the type in question are, for example, glycerol, trimethylolpropane, hexanetriol, pentaerythritol and triethanolamine.

Monofunctional components, for example butanol, may also be used for the production of the thermoplastic polyurethanes of component (B).

The diisocyanates, oligoesters, polyesters, polyethers, chain extenders and monofunctional components mentioned as structural elements for the thermoplastic polyurethanes are either known from the literature or may be obtained by methods known from the literature.

The known production of the polyurethane component (B) may be carried out, for example, as follows:

For example, the oligo- or polyesters, the organic diisocyanates and the chain extenders may be individually heated, preferably to a temperature of from about 50 to 220° C., and then mixed. Preferably, the oligo- or polyesters are first individually heated, then mixed with the chain extenders and the resulting mixture mixed with the preheated isocyanate.

The mixing of the starting components for the production of the polyurethanes may be mixed with any mechanical stirrer which provides for intensive mixing in a short time. If the viscosity of the mixture should prematurely rise too quickly during stirring, either the temperature may be lowered or a small quantity (0.001 to 0.05% by weight, based on ester) of citric acid or the like may be added to reduce the velocity of the reaction. Suitable catalysts, such as for example the tertiary amines mentioned in U.S. Pat. No. 2,729,618, may be used to increase the reaction velocity.

Crosslinked diene rubbers suitable for the production of the graft polymers of component C) are crosslinked polybutadienes and/or crosslinked polyisoprenes which may contain up to 40% by weight styrene and/or acrylonitrile as co-monomer. The gel content of the crosslinked diene rubbers used as the graft base should be $\geq$70% by weight and preferably $\geq$80% by weight (as measured in toluene). The preferred graft base consists of crosslinked polybutadiene.

Graft monomers in the context of the invention are aliphatic esters of acrylic acid and methacrylic acid containing up to 22 C atoms. Preferred graft monomers are esters of methacrylic acid. Of the esters of acrylic or methacrylic acid, the methyl, ethyl, n-butyl, tert.-butyl, octyl and ethyl hexyl esters or mixtures thereof are particularly preferred.

The graft polymers of component (C) to be used in accordance with the invention may be prepared by any known polymerization process (emulsion, solution, bulk, suspension, precipitation polymerization) and by any combination of these processes. Such processes are described, for example, in DAS 1 247 665.

To produce the graft polymers, the monomers to be grafted on are polymerized in the presence or the preformed graft base. Besides the actual graft polymer, free homopolymer is also formed. Graft polymers are understood to be the sum of the actual graft copolymers and the free polymers. The quantity of the monomer grafted on and its molecular weight may be influenced within wide limits by variation of the polymerization conditions, including above all the type of polymerization process, the temperature, the catalyst system, the molecular weight regulator, the stirring conditions and the method by which the monomers are added. According to the invention, the graft yield G should be $>0.15$ and preferably $>0.40$. The graft yield G is the quantitative ratio of monomer grafted on to the total quantity of monomers in the graft overlay and is dimensionless.

The preferred polymerization process for the graft polymers according to the invention is emulsion polymerization.

Crosslinked butadiene polymers preferably obtained by emulsion polymerization are preferably used as the graft bases for the production of the graft polymers by emulsion polymerization. According to the invention, it is preferred to use graft products which have an "average particle diameter" $d_{50}$ of from 0.2 to 0.6 $\mu$, preferably from 0.3 to 0.5 $\mu$ and more preferably of the order of 0.4 $\mu$.

Mixtures of several graft bases may also be used for the production of the graft polymers of component (C).

In addition, mixtures of several graft polymers to be used in accordance with the invention may also be used as component (C).

Particularly preferred graft polymers of component (C) are those of (a) 70 to 95% by weight and preferably 75 to 90% by weight of a crosslinked polymer of butadiene and/or substituted butadiene which is made up of at least 95% by weight of optionally substituted butadiene units as the graft base and (b) 5 to 30% by weight and preferably 10 to 25% by weight of one or more alkyl (meth)acrylates as the monomers to be grafted on, the gel content of the graft base having to be $\geq$70%, preferably $\geq$80% by weight (as measured in toluene), the graft yield G $>0.15$ and preferably $>40$ and the average particle diameter of the graft base 0.2 to 0.6, preferably 0.3 to 0.5 and more preferably of the order of 0.4 $\mu$m and the alcoholic component of the (meth)acrylates containing 1 to 5 C atoms.

The production of the molding compounds according to the invention from components A, B and C may be carried out in standard mixing units, particularly extruders and kneaders. All three components may be mixed all at once or, as required, two of the components may be individually mixed first and the third added in another step.

This compounding may be combined with the incorporation of auxiliaries, reinforcing materials and/or pigments suitable for polycarbonates, polyurethanes and/or graft polymers in the molding compounds according to the invention, although such additives may also be separately incorporated in the molding compounds and/or components A, B and C. Individual examples of such additives include inter alia glass fibers, carbon fibers, fibers of organic and inorganic polymers, calcium carbonate, talcum, silica gel, quartz powder, flow aids, mold release agents, stabilizers, carbon black and $TiO_2$.

Accordingly, the present invention also relates to the production of mixtures containing components (A), (B), (C) and, optionally, suitable auxiliaries, reinforcing materials and/or pigments, characterized in that components (A), (B), (C) and, optionally, suitable auxiliaries, reinforcing materials and/or pigments are mixed in standard mixing units and the resulting mixture is homogenized in known manner in the melt and, finally, extruded.

The mixtures according to the invention may be processed to moldings, semi-finished products and films in standard processing machines, such as injection molding machines and extruders.

Accordingly, the present invention also relates to the use of the mixtures according to the invention for the production of fuel - resistant moldings, more especially by injection molding or extrusion.

The fuel-resistant moldings according to the invention are used in particular in vehicle construction.

EXAMPLES

Identification of the thermoplastic polyurethanes (TPU) used. $\overline{Mn}$ was determined in each case.

TPU 1:

It had a melting range of approximately 200 to 220° C. and a number average molecular weight ($\overline{Mn}$) of 85,700. It was synthesized from an oligoester of 1,4-butylene glycol and adipic acid ($\overline{Mn}$ 2000), 4,4-diphenyl methane diisocyanate and butane-1,4-diol as chain extender. The ratio of NCO to OH groups was 1.03.

TPU 2:

It had a melting range of 190 to 210° C. and a number average molecular weight ($\overline{Mn}$) of 79,300. It was prepared from oligobutylene glycol ($\overline{Mn}$ 1000, OH value 112), 4,4-diphenyl methane diisocyanate and butane-1,4-diol as chain extender. The ratio of NCO to OH groups was 1.03.

Production of the Graft Polymers Used Production of

A solution of 80 parts by weight deionized water, 1.5 parts by weight of the sodium salt of disproportionated abietic acid and 0.3 part by weight potassium peroxy disulfate is introduced into a pressure-tight stirred vessel. After the air has been displaced by nitrogen and the internal temperature adjusted to 55° C., 0.35 part by weight dodecyl mercaptan and X parts by weight butadiene are added and the mixture polymerized. As polymerization progresses, the temperature is slowly increased to 68° C. with decreasing polymerization velocity (X corresponds to the values of Table 1).

On completion of polymerization, small quantities of the unreacted butadiene are removed by thoroughly stirring the latex obtained under reduced pressure.

175 Parts by weight deionized water and 0.3 part by weight potassium peroxydisulfate are added.

After displacement of the air by nitrogen and heating to 65° C., 2 parts by weight emulsifier (Na salt of disproportionated abietic acid or alkyl sulfonates) dissolved in 25 parts by weight water and Y parts by weight of the monomers listed in Table 1 (Y corresponds to the values in Table 1) are added.

The addition time is approximately 4 hours. To complete the reaction, the reaction mixture is stirred for 2 hours at 65° C. after the addition.

After addition of 1 part by weight of a phenolic antioxidant (2,6-di-tert.-butyl-p-cresol), the resulting graft polymer latex is coagulated with 2% MgSO$_4$/acetic acid solution (mixing ratio 1:1 part by weight), the coagulate is separated off, washed free from salts and dried in vacuo at 70° C.

The composition of the graft polymers is shown in Table 1.

TABLE 1

| | Composition of the graft products | | |
|---|---|---|---|
| Type | Parts by weight polybutadiene X | Parts by weight graft monomer Y | Average particle diameter μm |
| A | 80 | 20 MMA/n-BA (9:1) | 0.4 |
| B | 80 | 20 S/AN (72/28) | 0.4 |
| C | 80 | 20 MMA | 0.4 |
| D | 60 | 40 MMA | 0.4 |
| E | 80 | 20 MA | 0.4 | n-BA = n-butyl acrylate
t-BA = tert.-butyl acrylate
S = styrene
AN = acrylonitrile
MMA = methyl methacrylate
MA = methyl acrylate The compositions of the mixtures thus prepared and their properties are shown in Table 2. The mixtures were compounded in a Werner and Pfleiderer type ZSK 32 twin-screw extruder. The maximum temperatures reached in the melt are shown in Table 2. Test bars measuring 127×12.7×4 mm were made from the compounded mixtures by injection molding in order to evaluate flaking on flexing and surface quality.

To evaluate the flow line shadows, standard small test bars (DIN 53 542) were gated at both ends (cylinder diameter 30 mm, 900 bar).

A polycarbonate (PC) based on BPA (2,2-bis-(4-hydroxyphenyl)-propane) having a relative solution viscosity ($n_{rel}$) of 1.247, as measured on a solution of 0.5 g polycarbonate in 100 ml CH$_2$Cl$_2$ solution at 25° C., was used for the tests.

The flexing of the test bars to evaluate flaking and the flexural fatigue strength to failure were carried out by hand through 180° C. in both directions.

Flaking, test bar surface and flow shadows were visually evaluated by comparison. In Table 2,
 − = not noticeable,
 + = just noticeable,
 ++ = clearly noticeable,
 +++ = very clearly noticeable.

To evaluate fuel resistance, test bars (made by injection molding) measuring 80×10×4 mm were subjected to the template test (W. Kaufmann, Bestimmung der Chemikalienbeständigkeit von Kunststoff, unter mechanischer Spannung, Kunststoffe 65 (1975), pages 155–157). Outer fiber strains of 1% were adjusted. A mixture of
 50% by volume toluene,
 30% by volume isooctane,
 15% by volume diisobutylene,
 5% by volume ethanol
was used as the test liquid in accordance with DIN 51 604, Part 1. The test was carried out as follows:

1st cycle:
A cotton wool plug impregnated with the test liquid is placed on the bending templates with the specimen applied thereto and left to act for 15 minutes. The specimen is then left to air for 15 minutes.

2nd cycle:
Corresponds to the 1st cycle.

Evaluation

On completion of the 2nd cycle, the sample removed from the template is inspected with the naked eye and evaluated as follows:

| Rating: | Feature: |
|---|---|
| 1 | no visible change |
| 2 | surface matted |
| 3 | fine cracks |
| 4 | serious cracks, failure |

The product described in Example 3 of EP 36 080 was used as the polyester carbonate (ester content 13 mol-%).

Examples identified by an asterisk are Comparison Examples.

TABLE 2

| Example no. | PC % by weight | TPU type | TPU % by weight | Graft Product type | Graft Product % by weight | Compounding temperature °C. | Flaking | Flexural fatigue strength, number of flexes to failure | Appearance of surface stains | Flow line shadows | Fuel resistance outer fiber strain 1% rating |
|---|---|---|---|---|---|---|---|---|---|---|---|
| *1 | 80 | 1 | 20 | — | — | 240 | ++ | 3 | ++ | ++ | 2–3 |
| *2 | 80 | 2 | 20 | — | — | 240 | + | 4 | ++ | ++ | 2–3 |
| 3 | 75 | 1 | 15 | A | 10 | 235 | − | 23 | − | − | 1–2 |
| 4 | 70 | 1 | 20 | A | 10 | 235 | − | 27 | − | − | 1–2 |

TABLE 2-continued

| Example no. | PC % by weight | TPU type | TPU % by weight | Graft Product type | Graft Product % by weight | Compounding temperature °C. | Flaking | Flexural fatigue strength, number of flexes to failure | Appearance of surface stains | Flow line shadows | Fuel resistance outer fiber strain 1% rating |
|---|---|---|---|---|---|---|---|---|---|---|---|
| 5 | 75 | 1 | 15 | C | 10 | 235 | + | 18 | − | − | 1-2 |
| *6 | 75 | 1 | 15 | B | 10 | 235 | ++ | 7 | ++ | ++ | 2-3 |
| *7 | 75 | 1 | 15 | D | 10 | 235 | + | 11 | + | + | 2 |
| 8 | 75 | 2 | 15 | A | 10 | 235 | − | 26 | − | − | 1-2 |
| 9 | 70 | 2 | 20 | C | 10 | 235 | − | 25 | − | − | 1-2 |
| 10 | 75 | 1 | 15 | E | 10 | 235 | − | 21 | − | − | 1-2 |
| *11 | 75 | 1 | 15 | 10% MZA-EPDM Example 3 EP 125 739 | | 235 | ++ | 9 | ++ | + | 3 |
| *12 | 75 | 1 | 15 | 10% MA-EPDM Example 9 EP 125 739 | | 235 | ++ | 7 | ++ | ++ | 2-3 |
| 13 | 75 polyester carbonate | 1 | 15 | A | 10 | 240 | − − | 21 | − − | − − | 1-2 |

We claim:

1. Mixtures containing
   (A) 45 to 87% by weight thermoplastic, aromatic poly(ester) carbonates,
   (B) 30 to 12% by weight thermoplastic polyurethanes and
   (C) 25 to 1% by weight graft polymer obtained by the known grafting of
   (C1) 5 to 30 parts by weight alkyl (meth)acrylates onto '(C2) 95 to 70 parts by weight crosslinked diene rubbers, the sum of (C1)+(C2) being 100 parts by weight and the average particle diameter $d_{50}$ of the crosslinked diene rubbers (C2) being from 0.2 μm to 0.6 μm.

2. Mixtures as claimed in claim 1, characterized in that component (C) obtained by grafting of 10 to 30 parts by weight (C1) onto 90 to 70 parts by weight (C2).

3. Mixtures as claimed in claim 1, characterized in that the average particle diameter $d_{50}$ of (C2) is from 0.3 μm to 0.5 μm.

4. Mixtures as claimed in claim 1 characterized in that the average particle diameter is 0.4 μm.

5. Mixtures as claimed in claim 1, characterized in that the mixtures additionally contain suitable auxiliaries, reinforcing materials and/or pigments.

6. Mixtures containing
   (A) 55 to 82% by weight thermoplastic, aromatic poly(ester) carbonates,
   (B) 25 to 12% by weight thermoplastic polyurethanes and
   (C) 20 to 6% by weight graft polymer obtained by the known grafting of
   ($C_1$) 5 to 30 parts by weight alkyl (meth) acrylates containing up to 22 C-atoms onto
   (C2) 95 to 70 parts by weight crosslinked diene rubbers selected from crosslinked polybutadienes, crosslinked polyisoprenes or a mixture thereof which contain up to 40% by weight styrene, acrylonitrile or both, as comonomer, the gel content of the crosslinked diene rubbers used as the graft base should be $\geqq 70\%$ by weight, the sum of (C1)+(C2) being 100 parts by weight and the average particle diameter $d_{50}$ of the crosslinked diene rubbers (C2) being from 0.2 μm to 0.6 μm.

* * * * *

UNITED STATES PATENT AND TRADEMARK OFFICE
CERTIFICATE OF CORRECTION

PATENT NO. : 4,929,674

DATED : MAY 29, 1990

INVENTOR(S) : NOUVERTNE ET AL

It is certified that error appears in the above-identified patent and that said Letters Patent is hereby corrected as shown below:

At Column 7, lines 54, 55 and 56, after each occurance of "µ", please insert --m--.

Signed and Sealed this

Eleventh Day of August, 1992

*Attest:*

DOUGLAS B. COMER

*Attesting Officer*     *Acting Commissioner of Patents and Trademarks*